US008620100B2

(12) United States Patent
Miura et al.

(10) Patent No.: US 8,620,100 B2
(45) Date of Patent: Dec. 31, 2013

(54) MOTION BLUR DEVICE, METHOD AND PROGRAM

(75) Inventors: Kenjiro Miura, Hamamatsu (JP); Kenji Takahashi, Hamamatsu (JP)

(73) Assignee: National University Corporation Shizuoka University, Shizuoka-shi (JP)

( * ) Notice: Subject to any disclaimer, the term of this patent is extended or adjusted under 35 U.S.C. 154(b) by 140 days.

(21) Appl. No.: 13/201,439

(22) PCT Filed: Feb. 15, 2010

(86) PCT No.: PCT/JP2010/052209
§ 371 (c)(1),
(2), (4) Date: Aug. 12, 2011

(87) PCT Pub. No.: WO2010/093040
PCT Pub. Date: Aug. 19, 2010

(65) Prior Publication Data
US 2011/0299793 A1    Dec. 8, 2011

(30) Foreign Application Priority Data

Feb. 13, 2009  (JP) ................................ 2009-031418

(51) Int. Cl.
*G06T 5/00* (2006.01)
(52) U.S. Cl.
USPC ........................................................ 382/255
(58) Field of Classification Search
None
See application file for complete search history.

(56) References Cited

U.S. PATENT DOCUMENTS

| 7,916,177 | B2 | 3/2011 | Motomura et al. | |
|---|---|---|---|---|
| 2002/0093588 | A1* | 7/2002 | Dantwala et al. | 348/459 |
| 2007/0247529 | A1 | 10/2007 | Toma et al. | |
| 2009/0074324 | A1* | 3/2009 | Ishiga et al. | 382/282 |
| 2009/0179995 | A1* | 7/2009 | Fukumoto et al. | 348/208.6 |
| 2011/0135206 | A1 | 6/2011 | Miura et al. | |

FOREIGN PATENT DOCUMENTS

| JP | 2007-183842 A | 7/2007 |
|---|---|---|
| JP | 2007-305113 A | 11/2007 |
| WO | WO-2009019848 A1 | 2/2009 |
| WO | WO-2009154294 A1 | 12/2009 |

OTHER PUBLICATIONS

Interframe Motion Deblurring Using Spatio-Temporal Regularization. Ikuko Tusbaki, Takashi Kamatsu, and Takahiro Saito. IEEE 2007.*
An Adaptive Video Stabilization Method for Reducing Visually Induced Motion Sickness. Ikuko Tusbaki, Toshiya Morita, Takahiro Saito and Kiyoharu Aizawa. IEEE 2005.*

(Continued)

*Primary Examiner* — Stephen R Koziol
*Assistant Examiner* — Delomia Gilliard
(74) *Attorney, Agent, or Firm* — Marshall, Gerstein & Borun LLP

(57) ABSTRACT

A motion blur control device uses inter-frame movement computation means to compute an inter-frame movement direction and an inter-frame movement amount from plural frame images acquired at a specific time interval. Motion blur correction means then generates a corrected frame image by correcting motion blur in a specific frame image in plural frame images based on the blur amount set within a range not exceeding the inter-frame movement amount and based on the inter-frame movement direction. Evaluation means evaluates the corrected frame image using a motion blur evaluation function. The motion blur control device controls the blur amount such that the motion blur evaluation function satisfies a specific condition.

12 Claims, 9 Drawing Sheets

GLOBAL MOTION ESTIMATION

SHAKE CORRECTION

MOSAICING

MOTION BLUR REMOVAL

(56) References Cited

OTHER PUBLICATIONS

International Search Report for PCT/JP2010/052209 dated May 18, 2010.
Fujisawa et al., "Video Stabilization with GPU," *IPSJ Journal*, 49:1-8 (2008).
Abash, "Fast Antialiasing," *r. Dobb's Journal*, pp: 139-140 and 142-143 (Jun. 1992).
Wu, "An Efficient Antialiasing Technique," *Computer Graphics*, 25:143-152 (1991).
Wu, "Fast Anti-Aliased Circle Generation," *Graphics Gemsll*. San Francisco, pp. 446-450 (1991).
Press et al., "Numerical Recipes in C++," *Cambridge University Press* (2002).
Press et al., "Numerical Recipes in C++," *Cambridge University Press* (2007).

\* cited by examiner

FIG. 3A $$\begin{pmatrix} 0 & 0 & 0 \\ 0 & 10 & 0 \\ 0 & 0 & 0 \end{pmatrix} - \begin{pmatrix} 1 & 1 & 1 \\ 1 & 1 & 1 \\ 1 & 1 & 1 \end{pmatrix} = \begin{pmatrix} -1 & -1 & -1 \\ -1 & 9 & -1 \\ -1 & -1 & -1 \end{pmatrix}$$

ORIGINAL IMAGE     FLATTENED IMAG     POST FILTERING IMAGE

GENERAL UNSHARP MASK

FIG. 3B $$\begin{pmatrix} 0 & 0 & 0 \\ 0 & 4 & 0 \\ 0 & 0 & 0 \end{pmatrix} - \begin{pmatrix} 0.3 & 0 & 0 \\ 0.7 & 1 & 0.3 \\ 0 & 0 & 0.7 \end{pmatrix} = \begin{pmatrix} -.3 & 0 & 0 \\ -.7 & 3 & -.7 \\ 0 & 0 & -.3 \end{pmatrix}$$

ORIGINAL IMAGE     FLATTENED IMAG     POST FILTERING IMAGE

DIRECTIONAL UNSHARP MASK

FIG. 8

GLOBAL MOTION ESTIMATION

SHAKE CORRECTION

MOSAICING

MOTION BLUR REMOVAL

MOTION BLUR DEVICE, METHOD AND PROGRAM

TECHNICAL FIELD

The present invention relates to a device, method and program for controlling motion blur in a video image.

BACKGROUND ART

Due to recent progress in integration technology video cameras are becoming more compact, less expensive, and generally available and widely used in various situations. In particular, in order to quickly collect information during a disaster, compact video cameras are being mounted to robots that perform searches for disaster victims in locations no accessible to people, to pilotless helicopters for disaster state assessment from the air, and to remotely operated rescue helicopters and the like.

However, robots to which video cameras are mounted vibrate themselves, and travel in situations where there are rough road surfaces and scattered obstacles due to earthquakes. Shake hence occurs in pictures sent from cameras mounted to robots.

This accordingly makes it difficult for an operator to immediately grasp a situation, with the possibility of screen sickness and operation being affected. There is consequently a need to perform video image processing in real time and to reduce shaking in pictures in order to suppress the influence from such picture shake.

Methods are currently being researched for digital cameras to reduce shake, with examples including camera shake correction functions such as electrical, optical, image sensor shifting methods and lens unit swing methods. However, such corrections functions are functions installed in a camera and are only capable of correcting pictures taken with that camera. This accordingly inevitably tends to making cameras larger in size and more expensive.

Due to recent developments in digital cameras and personal computers (PCs) processing such as video image processing can now be performed simply on a standard home PC, and there is a desire for stabilization processing for performing on a PC in order to improve versatility. However, real time processing is difficult due to the vast volume of data in a video image and the heavy load such processing imposes on the Central Processing Unit (CPU).

Use of a Graphics Processing Unit (GPU), graphics hardware specialized for high speed graphical processing, has been considered. GPUs are also installed in standard PCs and are capable of high speed computations using parallel processing. GPUs are available with processing capabilities, and in particular floating point computation capabilities, that are 10 times those of a CPU or greater.

There is a description by the inventors of "Stabilization of Video Images Using a GPU" as a technique for shake correction using a GPU (see Non-Patent Document 1). The technique described in Non-Patent Document 1 uses a BFGS method (a quasi-Newtonian method) algorithm when employing affine transformation for global motion estimation, and shake in the video image is corrected based on the estimated global motion. There are also improved techniques for global motion estimation using BFGS methods, such as those employed in the patent application for Japanese Patent Application 2008-162477 (filed Jun. 20, 2008).

Non-Patent Document 1: Fujisawa and two others, "Stabilization of Video Images Using a GPU", Information Processing Society of Japan, IPSJ Journal Vol. 49, No. 2, pages 1 to 8.

DISCLOSURE OF INVENTION

Technical Problem

However, even if global motion is estimated and a video image corrected there is still motion blur remaining within each frame. Motion blur is a "smear" that occurs due to camera movement during the exposure time, and since it depends on the movement amount within a single frame it cannot be removed by global motion correction. In image sensors (such as CDD, CMOS) employed for general video image capture there is a fixed inter-frame interval, but the exposure time (charge accumulation duration) in each of the frames varies according to the brightness of the image capture region. For example, the exposure time is short when bright and the exposure time is long when dark. The exposure time accordingly changes for each frame according to the brightness. Since the motion blur amount depends on the exposure time the motion blur amount is not fixed even when the image capture region is moving at a constant speed.

The present invention is made in consideration of the above circumstances and is directed towards the provision of motion blur control technology to perform control and/or reduce motion blur for each frame in a video image at high speed and with good precision, based on the movement amount computed in motion blur estimation.

Solution to Problem

In order to address the above objective a motion blur control device according to the present invention is a motion blur control device for controlling motion blur in a specific frame image among a plural of frame images during a specific time interval, the motion blur control device including: inter-frame movement computation means for computing an inter-frame movement direction and an inter-frame movement amount from the plural of frame images acquired during the specific time interval; motion blur correction means for generating a corrected frame image by correcting motion blur in the specific frame image based on a blur amount set in a range not exceeding the inter-frame movement amount and based on the inter-frame movement direction; and evaluation means for evaluating the corrected frame image using a motion blur evaluation function, wherein the blur amount is controlled such that the motion blur evaluation function satisfies a specific condition.

A motion blur control method according to the present invention is a motion blur control method for controlling motion blur of a specific frame image among a plural of frame images acquired during a specific time interval, the motion blur control method including: computing an inter-frame movement direction and an inter-frame movement amount from the plural of frame images acquired during the specific time interval; generating a corrected frame image by correcting motion blur in the specific frame image based on a blur amount set in a range not exceeding the inter-frame movement amount and based on the inter-frame movement direction; and evaluating the corrected frame image using a motion blur evaluation function, wherein the blur amount is controlled such that the motion blur evaluation function satisfies a specific condition.

A motion blur control program of the present invention is a motion blur control program for controlling motion blur of a specific frame image among a plural of frame images acquired during a specific time interval, the motion blur control program executable by a computer to function as: inter-frame movement computation means for computing an inter-frame movement direction and an inter-frame movement amount from the plural of frame images acquired during the specific time interval; motion blur correction means for generating a corrected frame image by correcting motion blur in the specific frame image based on a blur amount set in a range not exceeding the inter-frame movement amount and based on the inter-frame movement direction; and evaluation means for evaluating the corrected frame image using a motion blur evaluation function, wherein the blur amount is controlled such that the motion blur evaluation function satisfies a specific condition.

Configuration may be made such that the motion blur correction means includes: unsharp mask setting means for setting an unsharp mask based on the blur amount set in the range not exceeding the inter-frame movement amount and based on the inter-frame movement direction; and unsharp processing means for generating the corrected frame image by correcting motion blur in the specific frame image based on the unsharp mask.

Configuration may be made such that the motion blur correction means according to the present invention generates the corrected frame image by correcting motion blur in the specific frame image by performing deconvolution computation based on the blur amount set in the range not exceeding the inter-frame movement amount and based on the inter-frame movement direction.

Configuration may be made such that the inter-frame movement computation means of the present invention estimates global motion between the plural frame images and computes the inter-frame movement direction and the inter-frame movement amount based on affine transform parameters including a parallel movement amount and a rotation movement amount.

Configuration may be made such that the above affine transform parameters further include an image enlargement-reduction ratio.

Configuration may be made such that the plural frame images according to the present invention are frame images that are components of a video image.

The present invention may be configured such that the blur amount is changed, correction is repeatedly performed by the motion blur correction means, and evaluation is repeatedly performed by the evaluation means, until the motion blur evaluation function satisfies the specific condition, thereby reducing the motion blur of the specific frame image. The present invention may also be configured such that correction is repeatedly performed by the motion blur correction means and evaluation is repeatedly performed by the evaluation means until the motion blur evaluation function is a maximum value or a minimum value.

Configuration may be made such that the motion blur evaluation function (E) of the present invention is given by the following equation:

[Equation 1]

$$E = \sum_x \sum_y |(((I(x+2, y) - I(x+1, y)) - (I(x+1, y) - I(x, y))) - ((I(x+1, y) - I(x, y)) - (I(x, y) - I(x-1, y))) \times ((I(x, y+2) - I(x, y+1)) - (I(x, y+1) - I(x, y))) - ((I(x, y+1) - I(x, y)) - (I(x, y) - I(x, y-1))))|$$

In the above I (x,y) is a pixel value at coordinate (x,y) in an image subject to evaluation.

According to the above configurations of the present invention, motion blur control and/or reduction can be performed at high speed and with good precision. The inter-frame movement direction (parallel movement, rotational movement) can be computed by the related technology of the global motion estimation technology of the inventors. The present invention can estimate the direction of motion blur within a frame using the inter-frame movement directions, and can efficiently perform motion blur control in the frame by employing this information.

The inter-frame movement amount can be estimated by the global motion estimation technology, however since the motion blur within a single frame depends on the exposure time of the single frame, there is poor correlation between the inter-frame movement amount and the motion blur amount in a single frame. Accordingly, the blur amount set within a range not exceeding the inter-frame movement amount is changed until the motion blur evaluation function satisfies a specific condition, and repeated motion blur correction and repeated evaluation using the motion blur evaluation function is required in order to derive the optimum motion blur amount.

Since the inter-frame movement direction can be estimated in global motion estimation, the path between one frame and another frame can be modeled as a straight line or a curved line. Accordingly, the blur amount (movement distance) L is a linear quantity. By deriving the optimum value for the blur amount L, the frame image of the original can be corrected by convolution computation and unsharp mask, and motion blur can be reduced by performing high speed computation.

The time interval between the plural frame images in the present invention may be any amount, however it preferably corresponds to adjacent frames in a video image. However, application of the present invention is not limited to video images and application may be made to any plural frame images captured at a specific time interval. Motion blur can be reduced, for example, in plural frame images, such as those acquired with a single operation of the shutter of a digital camera.

The program according to the present invention can be provided stored on a computer readable storage medium.

Advantageous Effects of Invention

According to the above configurations of the present invention, motion blur control and/or reduction can be performed at high speed and with good precision for each frame in a video image, based on the movement direction computed in global motion estimation.

BRIEF DESCRIPTION OF DRAWINGS

FIG. 3A is a diagram showing an example of an unsharp mask using 9 pixels.

FIG. 3B is a diagram showing an example of an unsharp mask using 9 pixels.

FIG. 8 is a flow chart of motion blur removal.

BEST MODE FOR CARRYING OUT THE INVENTION

A detailed explanation follows regarding a preferably exemplary embodiment of the present invention with reference to the drawings.

Device Configuration

Figure 1:
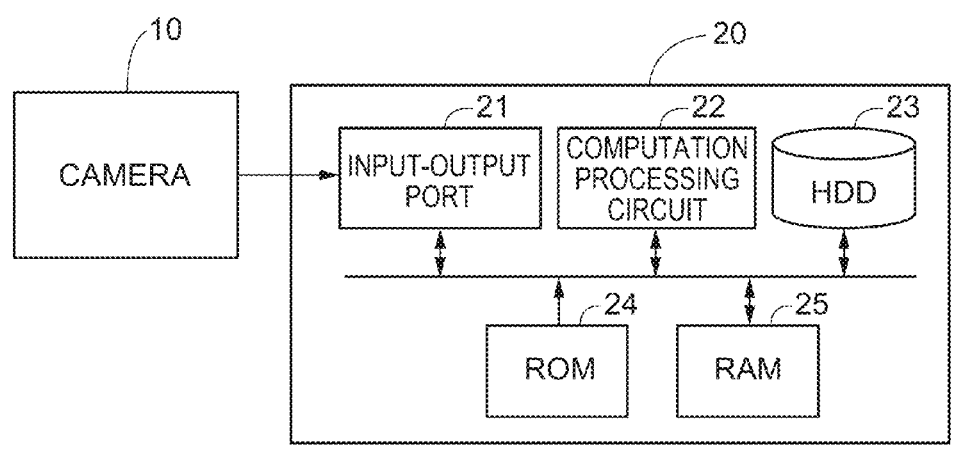
FIG. 1 is a block diagram of an image correction device according to an exemplary embodiment of the present invention.

FIG. 1 is block diagram illustrating a configuration of an image correction device according to an exemplary embodiment of the present invention. The image correction device is equipped with a camera 10 for generating images captured of an image subject, and an image processing device 20 for performing image processing so as to remove blur in the image generated by the camera 10.

The image processing device 20 is equipped with: an input-output port 21 for performing signal transmission with the camera 10; a computation processing circuit 22 for performing computation processing; a hard disk drive 23 for storing images and other data; a Read Only Memory (ROM) 24 for storing a control program for the computation processing circuit 22; and a Random Access Memory (RAM) 25 that serves as a data work area.

When the computation processing circuit 22 has received video images from the camera 10 through the input-output port 21 the computation processing circuit 22 derives a movement direction and movement amount (global motion) of the camera 10 for each single frame of the image frames configuring the video image. The computation processing circuit 22 performs shake correction on each frame image based on the global motion between frames and also controls or removes motion blur based on the inter-frame movement direction.

In the present exemplary embodiment parallel processing is applied for computations such as calculation of evaluation functions, deconvolution computation and unsharp mask generation, and high speed processing can be achieved by computing part of the computations using a Graphic Processor (GPU).

Motion Blur Removal

Methods for removing motion blur in images include methods such as deconvolution computation using Fourier transformation and sharpening using an unsharp mask. According to both of these methods, motion blur is removed by knowing camera movement during exposure.

Detailed explanation follows below.

Deconvolution Computation

For a blur containing image g(x), a blur removed image f(x) and a Point Spread Function (PSF) h(x), a blur containing image obtained from a non-blurred image is expressed by:

[Equation 2]

$$g(x) = \sum_x f(x)h(x-\xi) = f(x) \star h(x)$$

and a blur containing image can be generated by convolution computation. In the above the sign ★ means a convolution operator.

When the discrete Fourier transform of the blur containing image g(x) is denoted G(u), the discrete Fourier transform of the blur removed image f(x) is denoted F(u) and the discrete Fourier transform of the Point Spread Function (PSF) h(x) is denoted H(u), from the convolution theorem of a Fourier transform it follows that a blur containing image obtained from an image without blur can be represented as:

$$G(u) = \mathcal{F}\{f(x) \star h(x)\} = F(u)H(u) \quad \text{[Equation 3]}$$

In the reverse direction, blur removal to obtain an image without blur from a blur containing image can be represented as:

[Equation 4]

$$\frac{G(u)}{H(u)} = \frac{1}{H(u)} F(u)H(u) = F(u)$$

This is called deconvolution.

However, sometimes this computation cannot be performed since there is the possibility that the denominator H(u) is 0, and the PSF also needs to be estimated. Explanation follows regarding measures to adopt for cases in which the denominator is 0, and regarding PSF estimation.

Four methods are given here as examples of computation methods for deconvolution.

(1) Deconvolution

In the simplest method, branched conditions are employed for cases in which the denominator as an arbitrary constant A is 0 using the equation below.

[Equation 5]

$$F(u) = \begin{cases} A & (H(u) = 0) \\ \dfrac{G(u)}{H(u)} & (H(u) \neq 0) \end{cases}$$

While the calculation equation is simple and computation can be performed relatively fast, A is present as an arbitrary constant and there is a possibility of inaccurate computation.

(2) Weiner Filter

A Weiner filter is a method to avoid the denominator from being 0 by inserting an extremely small value for the denominator. An appropriate constant Γ (noise) is employed in computation as per the following equation.

[Equation 6]

$$F_w(u) = \frac{1}{H(u)} \frac{|H(u)|^2}{|H(u)|^2 + \Gamma} = \frac{\overline{H}(u)}{|H(u)|^2 + \Gamma}$$

Here H(u) bar, (H with a bar line above) is the complex conjugate of H(u). The computation equation for a Weiner filter is simple, and computation can be performed relatively fast, however noise Γ is presumed to be constant and there is a possibility of computation becoming unstable.

(3) Richardson-Lucy Deconvolution

Richardson-Lucy Deconvolution employs Bayes' theorem with computation according to the following equation.

[Equation 7]

$$f(x)^{(t+1)} = f(x)^{(t)} \sum_x \frac{g(x)}{\sum_y f(y)^{(t)} h(y-\eta)} h(x-\xi)$$

There is no division in Fourier space and a stable solution is obtained, however the computation speed is extremely slow. There is also the possibility in real space of the denominator becoming 0 in a completely black portion.

Regarding Richardson-Lucy Deconvolution there is a description in 'W. H. Richardson, "Bayesian-Based Iterative Method of Image Restoration" J. Opt. Soc. Am., Vol. 62, pp. 55-59, 1972' and 'Lucy, L. B., "An iterative technique for the rectification of observed distributions" Astronomical Journal, Vol. 79, pp. 745-754, 1974'.

(4) Iterative Back-Projection

Division is removed from the computation equation in iterative back-projection and the following equation is employed.

[Equation 8]

$$f(x)^{(t+1)} = f(x)^{(t)} + \alpha \sum_x \left( g(x) - \sum_y f(y)^{(t)} h(y-\eta) \right) h(x-\xi)$$

There is no division in this equation, and a stable solution is obtained, however the computation speed is extremely slow. Note that (0<α<1) applies. Regarding iterative back-projection, there is a description in 'Irani, Peleg, "Improving Resolution by Image Registration" CVGIP: Graphical Models and Image Processing, Vol. 53, pp. 231-239, 1991'.

Unsharp Mask

Figure 2:
FIG. 2 is an explanatory diagram of an unsharp mask.

An unsharp mask, as shown in FIG. 2, is a sharpening filter for deriving the difference between an original image and an unsharp (flattened) image. For example, unsharp masks employing peripheral 9 pixels are shown in FIG. 3A and FIG. 3B.

In the present exemplary embodiment directionality is applied to unsharp, such that sharpening is performed in a direction corresponding to the motion blur, as shown in FIG. 3B.

PSF, Unsharp Mask Estimation

In order to remove motion blur a PSF employed for deconvolution computation and a flattened image used for an unsharp mask need to be appropriately generated.

Figure 4:
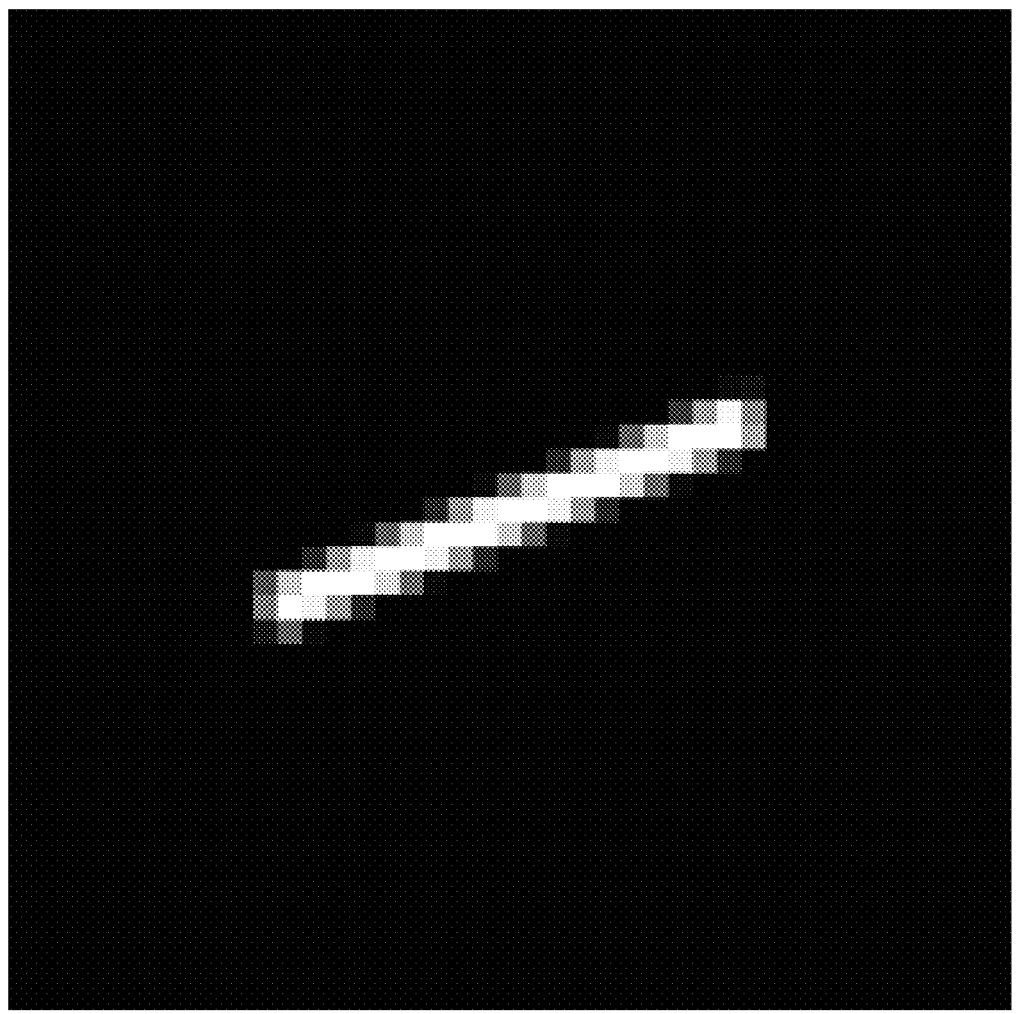
FIG. 4 is a diagram showing an example of a kernel H of an unsharp mask.

A PSF or a mask used for an unsharp mask is denoted kernel H, with a kernel such as, for example, that shown in FIG. 4 employed.

Estimating the kernel requires iterative estimation to be performed, as described later, however in order to speed up iterative estimation a global motion constraint is applied, as described later.

Kernel Estimation Employing Global Motion

Higher speeds and higher precision can be achieved by modeling the camera movement direction as a straight or curved line from the global motion that has already been derived, and the performing iterative estimation of only the 1 variable for the camera movement distance (blur amount) L. In kernel H (FIG. 4) the camera movement distance L is the length of the white line.

Figure 5:
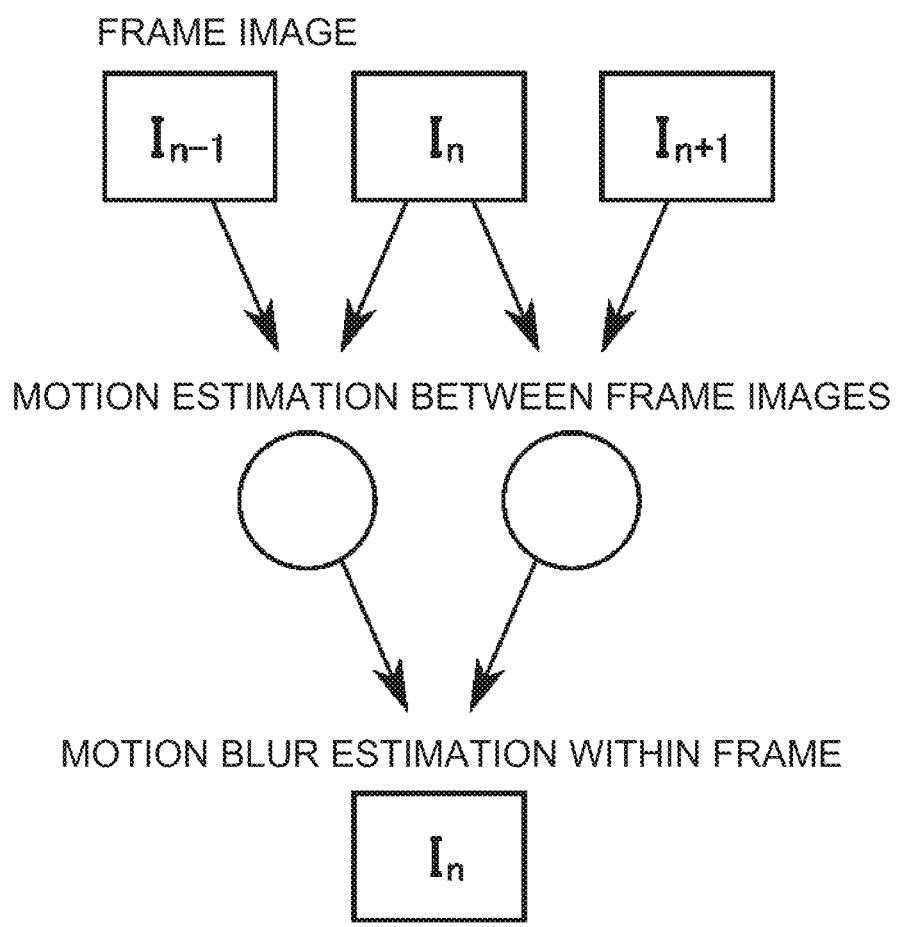
FIG. 5 is an explanatory diagram of inter-frame global motion estimation.
Figure 6:
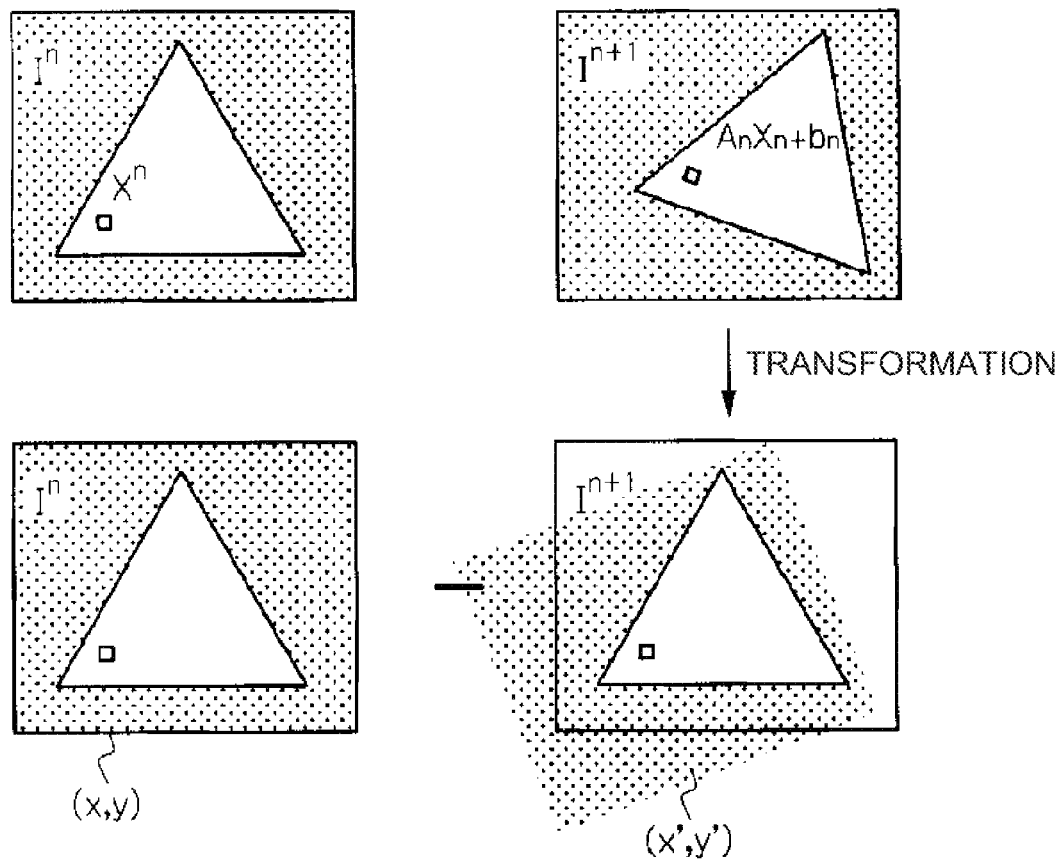
FIG. 6 is an explanatory diagram of inter-frame global motion estimation.

In order to model the camera movement direction as a straight or curved line from the global motion, motion is estimated between $I_{n-1}$ and $I_n$ and motion is estimated between $I_n$ and $I_{n+1}$ wherein in the video image the frame image one frame previous is $I_{n-1}$, the current frame image is $I_n$, and the frame image one frame later $I_{n+1}$. The movement at $I_n$ can be estimated from these two motions, and the blur direction can be estimated accordingly for the current frame image $I_n$ independently for all of the individual pixels (see FIG. 5 and FIG. 6).

Figure 7:
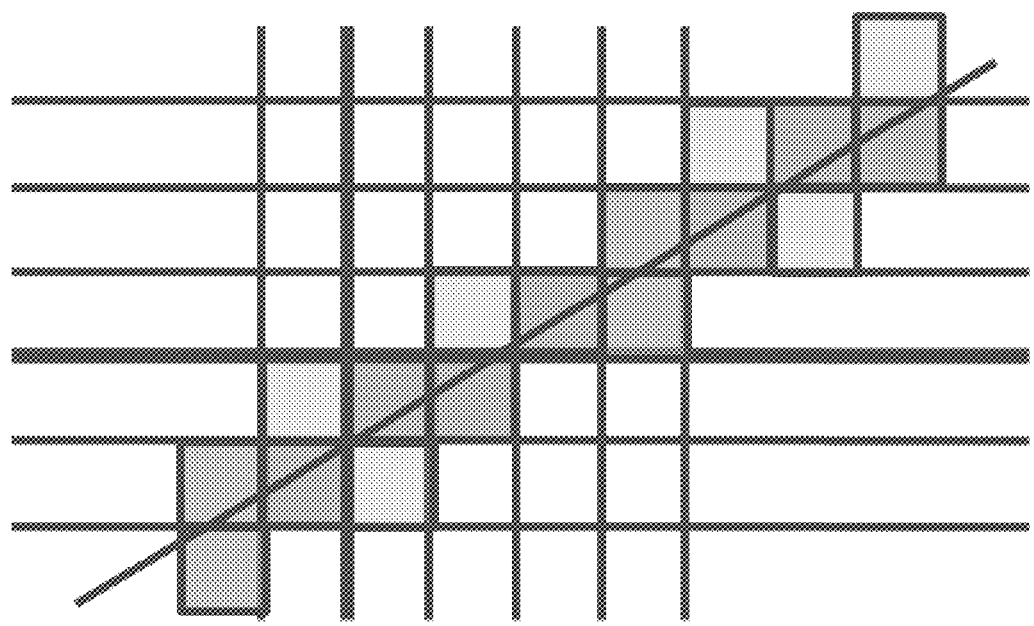
FIG. 7 is a diagram illustrating an example of a straight line image using a Xiaolin Wu algorithm.

Generation of a line (straight or curved line) representing the camera movement direction referred to above may be achieved by employing, for example, a Xiaolin Wu algorithm usable in antialiasing. A zigzag (jagged) shape is generated when a line is generated on an image of limited pixel size, due to the size of the pixels. In order to reduce the influence from this jaggedness the values of pixels located at zigzag (jagged) portions at the periphery of the line are given an intermediate gradation according to the distance from the center of the line. This is called "antialiasing" (see FIG. 7). Processing in this manner enables computation to be performed smoothly even at the pixel size or below. Details regarding such processing are described in non-patent publications 'Abrash, Michael (June 1992) "Fast Antialiasing (Column)", Dr. Dobb's Journal 17 (6): 139 (7)', 'Wu, Xiaolin (July 1991) "An efficient antialiasing technique", Computer Graphics 25 (4): 143-152. doi: 10.1145/127719. ISBN 0-89791-436-8', 'Wu, Xiaolin (1991) "Fast Anti-Aliased Circle Generation" in James Arvo (Ed.) Graphics Gems II, San Francisco: Morgan Kaufmann pp. 446-450 ISBN 0-12-06 4480-0'.

Kernel Generation by Iterative Estimation

The original image of the $n^{th\,frame}$ image is denoted $I_n$ (x, y). $I_n$ (x, y) is the pixel value (such as brightness) of a pixel at coordinates x,y in the frame image. Accordingly a correction frame image $I'_n$ (x, y, $L_n$) is generated by performing convolution computation and unsharp masking as described above corresponding to the blur amount (movement distance) $L_n$, and evaluation is performed according to a motion blur evaluation function E as expressed by the following Equation (1).

[Equation 9]

$$E = \sum_{x=0}^{w-1} \sum_{y=0}^{h-1} |(((I(x+2, y) - I(x+1, y)) - (I(x+1, y) - I(x, y))) - \\ ((I(x+1, y) - I(x, y)) - (I(x, y) - I(x-1, y))) \times \\ ((I(x, y+2) - I(x, y+1)) - (I(x, y+1) - I(x, y))) - \\ ((I(x, y+1) - I(x, y)) - (I(x, y) - I(x, y-1))))| \qquad (1)$$

For the evaluation subject image I (x, y), the motion blur evaluation function E is a function to calculate third order differentials in the X direction and the Y direction for given pixels, and to integrate those across the whole image, and is a function expressing the sharpness of the image. w and h are respectively the width and height (pixel number) of the motion blur evaluation range of the evaluation subject image. The motion blur evaluation range may be configured as the whole of the image, or as only a portion of the image.

Iterative estimation is performed with the correction frame image $I'_n(x, y, L_n)$ as the evaluation subject image I, deriving the blur amount $L_n$ so as to maximize E while changing the blur amount $L_n$, such that ultimately an appropriate $L_n$ can be derived. Iterative estimation is performed in the range 0 to 1 with the blur amount $L_n$ normalized to 1 for the inter-frame time interval. Note that it is not necessary to continue iterative estimation of blur amount $L_n$ until the maximum value for E is achieved, and configuration may be made such that iteration is halted when an appropriate condition is satisfied. For unsharp masking in particular, configuration may be made with only a small number of iterations since there is no requirement for the same degree of accuracy as that of a PSF in deconvolution computation.

Relatively high speed computation is possible since the evaluation function of Equation (1) is configured with only multiplication and subtraction.

Brent's method useable with a single variable and a limited search range is employed for this iterative estimation. There is a description regarding Brent's method in '"Numerical Recipes in C++", Cambridge University Press, W.H. Press, S. A. Teukolsky and W. T. Vetterling and B. P. Flannery, 2002'.

Note that the evaluation function of Equation (1) is not limited to evaluation subjects of video images. The evaluation function of Equation (1) may be employed for simple independent search without the search range limited by using the global motion.

Overall Processing Flow

FIG. 8 shows an overall flow diagram.

First "global motion estimation" between frames of a video image is performed by the method described in the non-patent document 1 above and/or in Japanese Patent Application 2008-1624777, and "shake correction" is performed based on the inter-frame movement amount and movement direction.

Then inter-frame interpolation is performed using "mosaicing" for any undefined regions arising in peripheral portions due to shake correction.

This is then followed by performing the "motion blur removal" that is a feature of the present invention.

Figure 9:
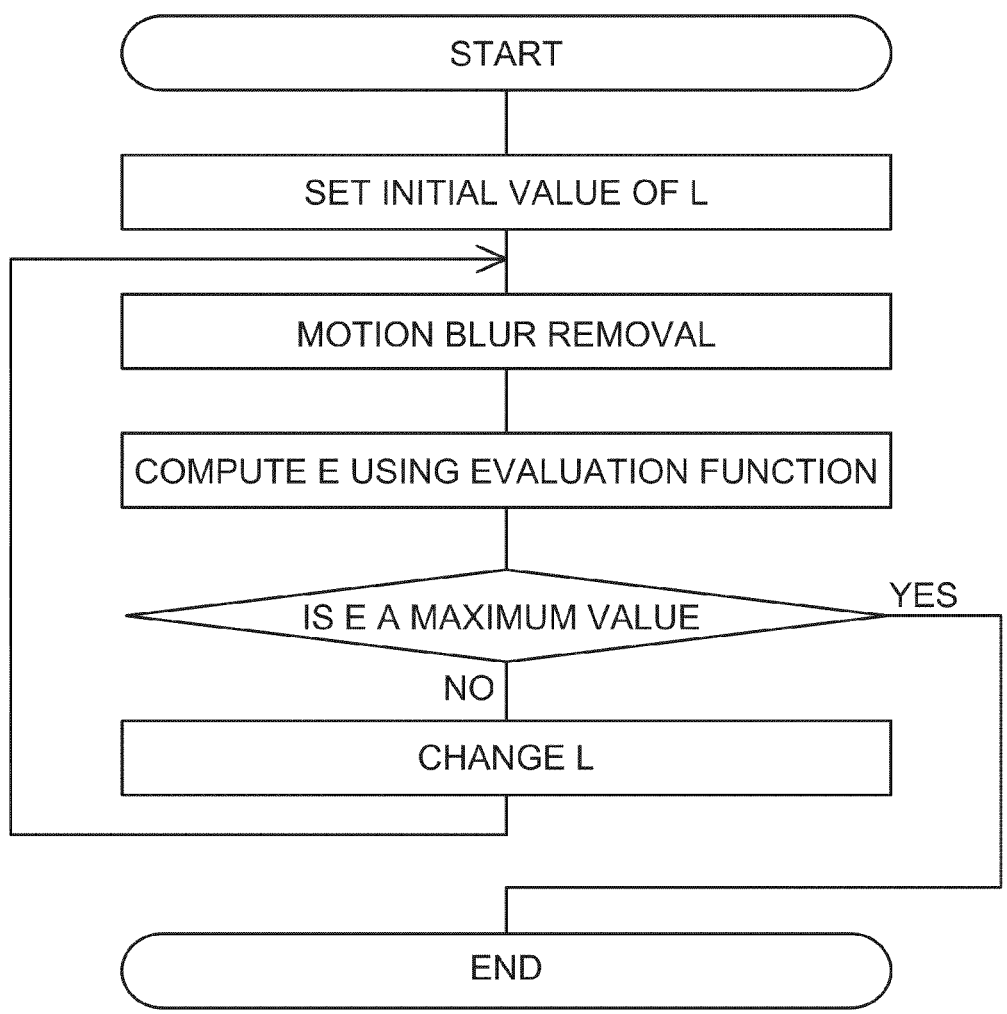
FIG. 9 is a diagram showing a motion blur removal result (left hand image: prior to removal, right hand image: post removal).

FIG. 9 shows a flow chart of motion blur removal.

First an initial value is set for the initial value of blur amount L (=0 to 1) a "set initial value of L". L is the ratio of motion blur amount to the inter-frame movement amount, and corresponds to (exposure time of one frame)/(inter-frame separation interval). There is no particular limitation to the initial value set, however the L derived in motion blur removal for the previous frame may be employed as the initial value since the exposure time does not change much for each frame.

In "motion blur removal" the above deconvolution computation and unsharp masking is employed, and motion blur corresponding to the blur amount L is removed.

In "compute E using evaluation function" the evaluation value for motion blur removal E is computed using Equation (1).

"Motion blur removal" and "compute E using evaluation function" are repeatedly performed while "change L" until "E is a maximum value". Note that there is no need to continue calculating until E is the maximum value and configuration may be made such that computation is halted at the stage when an appropriate condition is satisfied.

Figure 10:
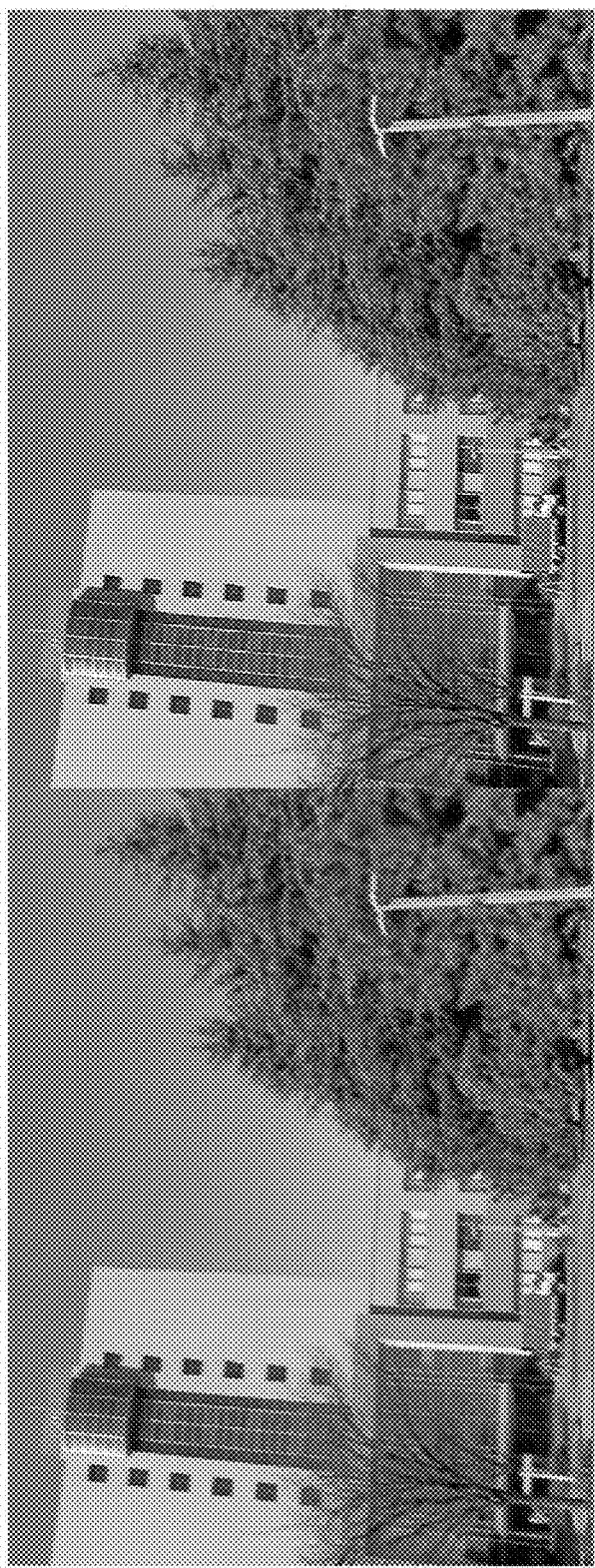
FIG. 10 is a diagram illustrating a blur removal result by deconvolution computation.

FIG. 10 shows a blur removal result from deconvolution computation. The left hand side of FIG. 10 is an image prior to motion blur removal, and the right hand side of FIG. 10 is an image after motion blur removal.

Modified Exemplary Embodiment

In the above exemplary embodiment explanation has been given regarding an exemplary embodiment in which the optimum value for blur amount L is derived, and motion blur is reduced or removed, however there is no limitation thereto. Depending on the application, since there are sometimes cases when it is preferable to leave a small amount of motion blur a value may be set that is shifted from the optimum blur amount L. In such cases the motion blur evaluation function E is employed to derive a blur amount L that is shifted by a specific proportion from that at the maximum value of E. Application can also be made to cases in which motion blur is deliberately added in order to emphasize movement.

EXPLANATION OF THE REFERENCE NUMERALS

10 CAMERA
20 IMAGE PROCESSING DEVICE
21 INPUT-OUTPUT PORT
22 COMPUTATION PROCESSING CIRCUIT
23 HDD
24 ROM
25 RAM

The invention claimed is:

1. A motion blur control device for controlling motion blur in a specific frame image among a plurality of frame images acquired during a specific time interval, the motion blur control device comprising:
a image processing device having a processor circuit and configured to,
perform an inter-frame movement computation for computing an inter-frame movement direction and an inter-frame movement amount from the plurality of frame images acquired during the specific time interval,
perform a motion blur correction for generating a corrected frame image by correcting motion blur in the specific frame image based on a blur amount set in a range not exceeding the inter-frame movement amount and based on the inter-frame movement direction, and
perform an evaluation for evaluating the corrected frame image using a motion blur evaluation function, wherein the motion blur evaluation function includes a third order differential of the corrected frame image, wherein the blur amount is adjustable using the evaluation during blur correction such that the motion blur evaluation function satisfies a specific condition.

2. The motion blur control device of claim 1, wherein the image processing device is configured such that the motion blur correction is to perform:
an unsharp mask setting for setting an unsharp mask based on the blur amount set in the range not exceeding the inter-frame movement amount and based on the inter-frame movement direction; and
an unsharp processing for generating the corrected frame image by correcting motion blur in the specific frame image based on the unsharp mask.

3. The motion blur control device of claim 1, wherein the image processing device is configured such that the motion blur correction generates the corrected frame image by correcting motion blur in the specific frame image by performing deconvolution computation based on the blur amount set in the range not exceeding the inter-frame movement amount and based on the inter-frame movement direction.

4. The motion blur control device of claim 1, wherein the image processing device is configured such that the inter-frame movement computation estimates global motion between the plurality of frame images and computes the inter-frame movement direction and the inter-frame movement amount based on affine transform parameters including a parallel movement amount and a rotation movement amount.

5. The motion blur control device of claim 4, wherein the affine transform parameters further include an image enlargement-reduction ratio.

6. The motion blur control device of claim 1, wherein the plurality of frame images are frame images that are components of a video image.

7. The motion blur control device of claim 1, wherein the blur amount is changed, correction is repeatedly performed by the motion blur correction, and evaluation is repeatedly performed by the evaluation, until the motion blur evaluation function satisfies the specific condition, thereby reducing the motion blur of the specific frame image.

8. The motion blur control device of claim 7, wherein correction is repeatedly performed by the motion blur correction and evaluation is repeatedly performed by the evaluation, until the motion blur evaluation function is a maximum value or a minimum value.

9. The motion blur control device of claim 1, wherein the motion blur evaluation function (E) is given by the following equation:

[Equation 1]

$$E = \sum_x \sum_y |(((I(x+2, y) - I(x+1, y)) - (I(x+1, y) - I(x, y))) - \\ ((I(x+1, y) - I(x, y)) - (I(x, y) - I(x-1, y))) \times \\ ((I(x, y+2) - I(x, y+1)) - (I(x, y+1) - I(x, y))) - \\ ((I(x, y+1) - I(x, y)) - (I(x, y) - I(x, y-1))))|$$

wherein I (x,y) is a pixel value at coordinate (x,y) in an image subject to evaluation.

10. A motion blur control method for controlling motion blur of a specific frame image among a plurality of frame images acquired during a specific time interval, the motion blur control method comprising:

computing an inter-frame movement direction and an inter-frame movement amount from the plurality of frame images acquired during the specific time interval;

generating a corrected frame image by correcting motion blur in the specific frame image based on a blur amount set in a range not exceeding the inter-frame movement amount and based on the inter-frame movement direction; and evaluating the corrected frame image using a motion blur evaluation function, wherein the motion blur evaluation function includes a third order differential of the corrected frame image, and wherein the blur amount is adjustable during blur correction such that the motion blur evaluation function satisfies a specific condition.

11. A non-transitory computer-readable storage medium having stored thereon a set of instructions, executable by a processor, for controlling motion blur of a specific frame image among a plurality of frame images acquired during a specific time interval, the instructions comprising:

instructions for performing an inter-frame movement computation for computing an inter-frame movement direction and an inter-frame movement amount from the plurality of frame images acquired during the specific time interval;

instructions for performing a motion blur correction for generating a corrected frame image by correcting motion blur in the specific frame image based on a blur amount set in a range not exceeding the inter-frame movement amount and based on the inter-frame movement direction; and instructions for performing an evaluation for evaluating the corrected frame image using a motion blur evaluation function, wherein the motion blur evaluation function includes a third order differential of the corrected frame image, and wherein the blur amount is adjustable during blur correction such that the motion blur evaluation function satisfies a specific condition.

12. The motion blur control device of claim 1, wherein the motion blur evaluation function evaluates a sharpness of the corrected frame image.

* * * * *